(12) United States Patent
Chen (10) Patent No.: US 7,960,927 B2
(45) Date of Patent: Jun. 14, 2011

(54) ELECTRIC MOTOR CONTROL DEVICE AND DRIVE UNIT

(75) Inventor: Zhiqian Chen, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 414 days.

(21) Appl. No.: 12/318,497

(22) Filed: Dec. 30, 2008

(65) Prior Publication Data

US 2009/0189555 A1    Jul. 30, 2009

(30) Foreign Application Priority Data

Jan. 28, 2008   (JP) ................................. 2008-016414

(51) Int. Cl.
*H02P 7/00*   (2006.01)

(52) U.S. Cl. .................. 318/400.07; 318/607; 318/608; 318/490; 340/146.2; 361/31; 361/87

(58) Field of Classification Search ............. 318/400.07, 318/607, 608, 490; 361/31, 87; 340/146.2, 340/13.2–13.36
See application file for complete search history.

(56) References Cited

U.S. PATENT DOCUMENTS

| | | | | |
|---|---|---|---|---|
| 5,623,190 A | * | 4/1997 | Tajima et al. | 318/800 |
| 5,677,606 A | * | 10/1997 | Otake | 318/434 |
| 5,909,366 A | * | 6/1999 | Sanada | 363/98 |
| 6,731,095 B2 | * | 5/2004 | Satake et al. | 318/812 |
| 7,847,500 B2 | * | 12/2010 | Iwaji et al. | 318/432 |

FOREIGN PATENT DOCUMENTS

| | | |
|---|---|---|
| JP | A-03-155332 | 7/1991 |
| JP | A-06-245600 | 9/1994 |
| JP | A-2003-259698 | 9/2003 |
| JP | A-2003-333882 | 11/2003 |
| JP | A-2004-359178 | 12/2004 |
| JP | A-2005-162462 | 6/2005 |

* cited by examiner

*Primary Examiner* — Rita Leykin
(74) *Attorney, Agent, or Firm* — Oliff & Berridge, PLC (57) ABSTRACT

An electric motor control device includes a power supply unit that supplies power to a three-phase electric motor; a three-phase current sensor that individually detects three respective phase currents of the three-phase electric motor; a summing unit that calculates a three-phase sum by adding the three phase currents detected by the three-phase current sensor; a detected current correction unit that calculates correction amounts for at least two of the three phase currents based on a phase and an amplitude of the three-phase sum and then corrects phase current detection values by the calculated correction amounts; and a motor control unit that controls a power supply by the power supply unit to the three-phase electric motor by feedback control based on the three phase currents after correction by the detected current correction unit and on target currents.

11 Claims, 7 Drawing Sheets

ELECTRIC MOTOR CONTROL DEVICE AND DRIVE UNIT

INCORPORATION BY REFERENCE

The disclosure of Japanese Patent Application No. 2008-016414 filed on Jan. 28, 2008 including the specification, drawings and abstract is incorporated herein by reference in its entirety.

BACKGROUND

The present invention relates to an electric motor control device and drive unit.

In an electric motor control that controls a drive of a three-phase electric motor by three-phase current feedback control, if gains of three-phase current sensors are unbalanced due to a variability introduced during manufacturing, variability in adjustment of a signal processing circuit, or the like, motor current pulsation or motor torque pulsation occurs. In order to prevent the problem, the current sensors are corrected (see, for example, Japanese Patent Application Publication No. JP-A-2003-259698 and Japanese Patent Application Publication No. JP-A-2005-162462), or a safety margin is provided so that the current pulsation does not cause overcurrent.

Japanese Patent Application Publication No. JP-A-2003-259698 describes a circuit through which currents of two phases of a three-phase electric motor are detected by a current sensor and multiplied by gains in multipliers. Based on those results, the remaining current of another phase is calculated to obtain the three respective phase current values, which are then used as feedback values for vector control that controls a drive of an induction motor through a pulse width modulation (PWM) inverter. The correction of the detection gains of the above-described three respective phase currents fed back to the vector control is activated when a selector switch is turned to close the correction circuit. That is, by the close of the circuit, the correction circuit converts the three respective phase currents to a d-axis value and a q-axis value by three-phase/two-phase conversion, then extracts a harmonic component contained in a d-axis current, and adjusts the gain of the multiplier of a phase so as to minimize the absolute value of the harmonic component. Then, the correction circuit finishes the correction after storing the adjusted value in a storage element, and maintains the gain of the multiplier at the adjusted value until making the correction next time.

Japanese Patent Application Publication No. JP-A-2005-162462 describes an elevator control device in which three respective phase currents of a three-phase alternating current motor for driving up and down movements of an elevator by being supplied with power from an inverter are detected by current detectors and converted to two-axis values, and error output values for making the two-axis values to be desired values are converted by two-phase/three-phase conversion and then converted to PWM signals to drive the inverter. To correct the detection gains of the respective phase currents of the electric motor, a correction command switch is switched to a correction circuit side and also a torque current command is fixed to a predetermined value, and furthermore, particular timings, such as 60 degrees, 120 degrees and the like, are determined so that the rotor electric angle of one phase is zero and the sum of the rotor electric angles of the other two phases is zero. Then, the gains of the two phases are adjusted at those timings so that the sum of the detected three-phase currents is zero.

SUMMARY

In either of Japanese Patent Application Publication No. JP-A-2003-259698 and Japanese Patent Application Publication No. JP-A-2005-162462, because the gain adjustment is started by the selector switch, and also because the adjusted gain needs to be updated, stored, and held in the storage element, the gain adjustment is troublesome and also requires management. Because the gain remains fixed during the period from a preceding gain adjustment to a succeeding gain adjustment, it is possible that the gain no longer becomes appropriate due to a change such as a large variation in the motor current caused by a change in an operating condition of the electric motor during the period, or a shift in circuit characteristics caused by a change in temperature of the current sensor.

It is an object of the present invention to automatically correct motor current detection values of three-phase current sensors to balanced values in real time. The present invention can also achieve various other advantages.

The present invention individually detects three respective phase currents of the three-phase electric motor with respective current sensors, then calculates correction amounts for at least two of the three phase currents based on a phase and an amplitude of a sum of the detected three-phase currents, that is, a three-phase sum (0-degree phase-shifted current), and corrects the phase current detection values by the calculated correction amounts so as to be used as feedback current values for feedback control of the three-phase electric motor. More specifically, from the phase and the amplitude of the three-phase sum, that is, an unbalanced current, the present invention calculates at least two phase components of the unbalanced current, and corrects the phase currents corresponding to the respective three phase currents by the amounts of the calculated components.

According to an exemplary aspect of the invention, an electric motor control device includes a power supply unit that supplies power to a three-phase electric motor; a three-phase current sensor that individually detects three respective phase currents of the three-phase electric motor; a summing unit that calculates a three-phase sum by adding the three phase currents detected by the three-phase current sensor; a detected current correction unit that calculates correction amounts for at least two of the three phase currents based on a phase and an amplitude of the three-phase sum and then corrects phase current detection values by the calculated correction amounts; and a motor control unit that controls a power supply by the power supply unit to the three-phase electric motor by feedback control based on the three phase currents after correction by the detected current correction unit and on target currents.

BRIEF DESCRIPTION OF THE DRAWINGS

Various exemplary aspects of the invention will be described with reference to the drawings, wherein.

DETAILED DESCRIPTION OF EMBODIMENTS

Other purposes and features according to an aspect of the present invention will be made clear from the description of the embodiments below with reference to the drawings.

First Embodiment

Figure 1:
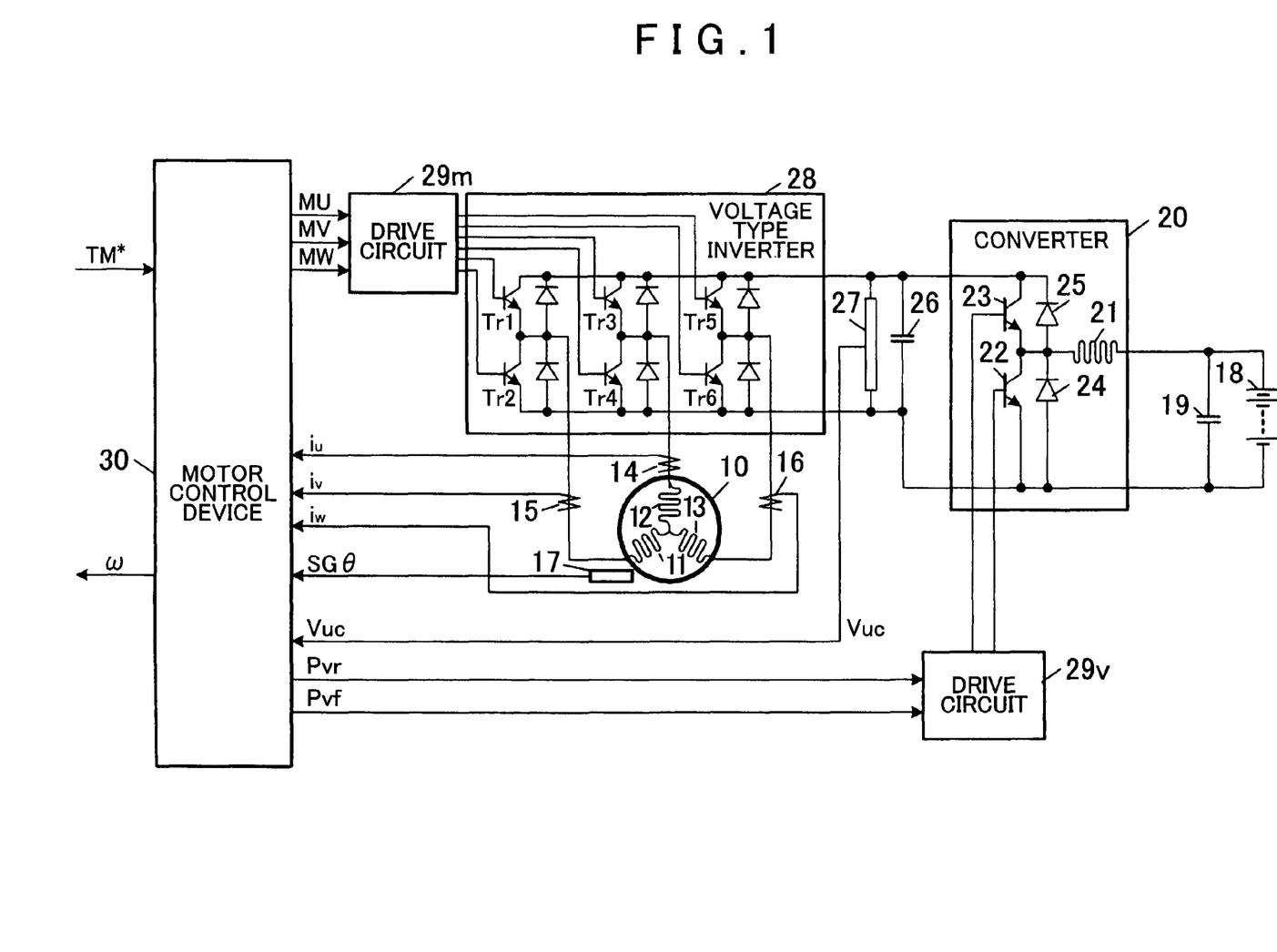
FIG. 1 is a block diagram showing an outline of a structure according to a first embodiment of the present invention.

FIG. 1 shows an outline of a first embodiment of the present invention. In the present embodiment, an electric motor 10 serving as an electric motor to be controlled is a permanent magnet type synchronous motor mounted on a vehicle for rotationally driving wheels, and has a rotor having a permanent magnet built therein and a stator having three phase coils 11 to 13 of U-phase, V-phase, and W-phase, respectively. A voltage type inverter 28 supplies power of a battery 18 mounted on the vehicle to the electric motor 10. A rotor of a resolver 17 for detecting a magnetic pole position of the rotor of the electric motor 10 is connected to the rotor of the electric motor 10. The resolver 17 generates an analogue voltage (rotational angle signal) SGθ representing a rotational angle of the rotor of the resolver 17, and provides the analogue voltage to a motor control device 30.

While power for electrical equipment on the vehicle is turned on, a primary-side capacitor 19 is connected to the battery 18 serving as an electric accumulator on the vehicle, constituting a primary-side direct current power source together with the battery 18. An end of a reactor 21 of a converter 20 is connected to a positive pole (plus line) of the primary-side direct current power source.

The converter 20 has, in addition, a voltage step-up switching element 22 for switching on and off between the other end of the reactor 21 and a negative pole (minus line) of the primary-side direct current power source, a voltage step-down switching element 23 for switching on and off between a positive pole of a secondary-side capacitor 26 and the other end of the reactor 21, and diodes 24 and 25 connected in parallel to the switching elements 22 and 23, respectively. An anode of the diode 24 is connected to the other end of the reactor 21 whereas a cathode thereof is connected to the positive pole of the secondary-side capacitor 26. An anode of the diode 25 is connected to the positive pole of the secondary-side capacitor 26 whereas a cathode thereof is connected to the other end of the reactor 21. Each of the switching elements 22 and 23 uses insulated gate bipolar transistor (IGBT) in the present embodiment.

When the voltage step-up switching element 22 is turned on (conductive), a current flows from the primary-side direct current power source 18, 19 through the reactor 21 to the switching element 22, resulting in charging of the reactor 21; whereas, when the switching element 22 is turned off (non-conductive), the reactor 21 discharges a high voltage to the secondary-side capacitor 26 through the diode 25. That is, a higher voltage than the voltage of the primary-side direct current power source is induced to charge the secondary-side capacitor 26. The high voltage charging of the secondary-side capacitor 26 is continued by repeating the turning on and off of the switching element 22. That is, the secondary-side capacitor 26 is charged at the high voltage. Because the power accumulated by the reactor 21 increases corresponding to the length of the time during which the switch is on while repeating the turning on and off in a constant period, it is possible to adjust the rate (power supply rate for power running: converter output voltage) at which the power is supplied from the primary-side direct current power source 18, 19 through the converter 20 to the secondary-side capacitor 26, by adjusting the time during which the switch is on within the constant period (on duty: ratio of the time in which the switch is on to the constant period), that is, by PWM control.

When the voltage step-down switching element 23 is turned on (conductive), the power accumulated in the secondary-side capacitor 26 is provided to the primary-side direct current power source 18, 19 through the switching element 23 and the reactor 21 (reverse power supply: regeneration). Also in this case, it is possible to adjust the rate (power supply rate for regeneration: converter output voltage) at which the power is reversely supplied from the secondary-side capacitor 26 through the converter 20 to the primary-side direct current power source 18, 19, by adjusting the time during which the switching element 23 is on within the constant period, that is, by PWM control.

The voltage type inverter 28 is provided with six switching transistors Tr1 to Tr6 that are driven to be turned on (conductive) through six respective sequences of drive signals generated in parallel by a drive circuit 29m to convert the direct current voltage of the secondary-side capacitor 26 (output voltage of the converter 20, that is, a secondary-side voltage Vuc) to three sequences of alternating current voltage with phase differences of 2π/3 between the sequences, that is, to a three-phase alternating current voltage. The three sequences are then applied to the stator coils 11 to 13 of three phases (U-phase, V-phase and W-phase) of the electric motor 10, respectively. As a result, phase currents iu, iv, and iw flow into the stator coils 11 to 13, respectively, of the electric motor 10, and then the rotor of the electric motor 10 rotates. All of the six switching transistors Tr1 to Tr6 are IGBTs.

In order to increase a capacity of power supply for driving on and off (switching) the transistors Tr1 to Tr6 with PWM pulses and also to suppress voltage surge, the secondary-side capacitor 26 of a large capacity is connected to a secondary-side output line of the converter 20 that serves as an input line of the inverter 28. On the other hand, the primary-side capacitor 19 constituting the primary-side direct current power source is of small size, low cost, and small capacity, with the capacity significantly smaller than that of the secondary-side capacitor 26. A voltage sensor 27 detects the secondary voltage Vuc of the converter 20 and provides it to the motor control device 30. On power supply lines connected to the stator coils 11 to 13 of the electric motor 10, there are mounted current sensors 14 to 16 using hole ICs that detect the phase currents iu, iv, and iw, respectively, to generate current detection signals (analogue voltages) to be provided to the motor control device 30.

Figure 2:
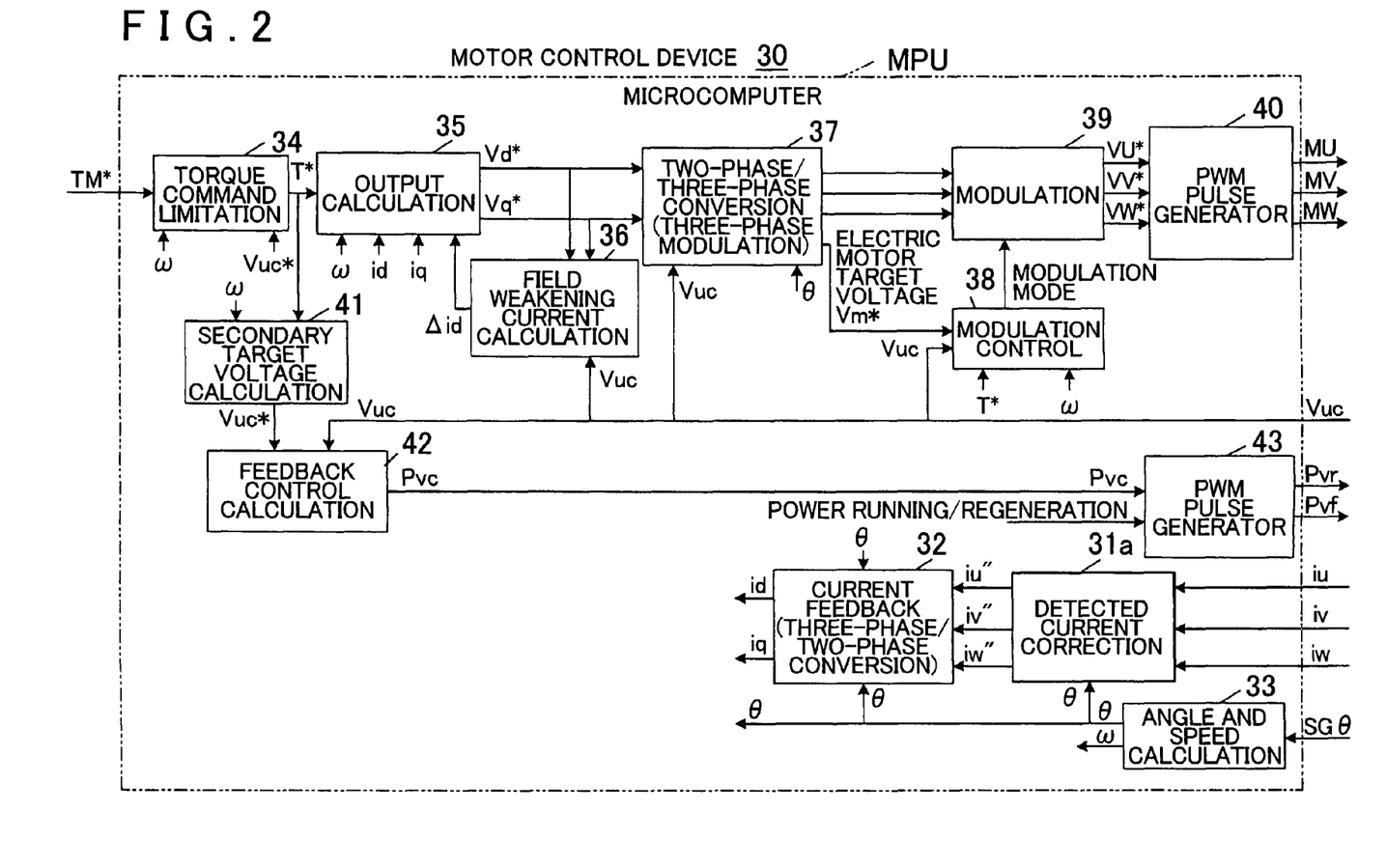
FIG. 2 is a block diagram showing an outline of a functional structure of a motor control device shown in FIG. 1.

FIG. 2 shows a functional structure of the motor control device 30. In the present embodiment, the motor control device 30 is an electronic control device mainly formed of a microcomputer MPU. The motor control device 30 contains an unshown interface (signal processing circuit) between the microcomputer MPU and each of the drive circuit 29m, the current sensors 14 to 16, the resolver 17, and the secondary voltage sensor 27, and further contains an unshown interface (communication circuit) between the microcomputer and an unshown main controller of a vehicle drive control system on the vehicle.

Referring to FIG. 2, it is seen that the microcomputer in the motor control device 30 calculates a rotational angle (magnetic pole position) θ and a rotational speed (angular velocity) ω of the rotor of the electric motor 10, based on the rotational angle signal SGθ provided by the resolver 17.

Note that, although the rotational angle of the rotor of the electric motor 10 is not exactly the same as the magnetic pole position, they are in a proportional relation, and the coefficient of proportionality is determined by the number of magnetic poles p of the electric motor 10. In addition, although the rotational speed is not the same as the angular velocity, they are also in a proportional relation, and the number of magnetic poles p of the electric motor 10 determines the coefficient of proportionality. In the present document, the rotational angle θ means the magnetic pole position. The rotational speed ω means the angular velocity, but sometimes means the rotational speed.

The unshown main controller of the vehicle drive control system provides a motor target torque TM* to the microcomputer MPU of the motor control device 30. Note that the main controller calculates a required vehicle torque TO* based on the vehicle speed and the accelerator opening of the vehicle, and corresponding to the required vehicle torque TO*, generates the motor target torque TM* that is then provided to the microcomputer MPU. The microcomputer MPU outputs the rotational speed ω rpm of the electric motor 10 to the main controller.

In a torque command limitation 34, the microcomputer MPU of the motor control device 30 reads a limit torque TM*max corresponding to a secondary target voltage Vuc* and the rotational speed ω from a limit torque table (look-up table), and sets the TM*max as a target torque T* if the target torque TM* exceeds the TM*max. The motor target torque TM* is set as the target torque T* if the target torque TM* is equal to or less than the TM*max. The motor target torque T* thus generated through the above-described limitation is provided to a secondary target voltage calculation 41 and an output calculation 35.

Note that the limit torque table is a memory area in which the secondary target voltage Vuc* and respective values of voltage within the range of the rotational speed are used as addresses, and at each of the address values, the maximum torque that can be generated by the electric motor 10 is written as the limit torque TM*max. Note also that the memory area means a memory area of an unshown RAM in the microcomputer MPU, in the present embodiment. The higher the secondary target voltage Vuc* is, the larger the limit torque TM*max is, whereas the lower the secondary target voltage Vuc* is, the smaller the limit torque TM*max is. Also, the lower the rotational speed ω is, the larger the limit torque TM*max is, whereas the higher the rotational speed ω is, the smaller the limit torque TM*max is.

The microcomputer MPU described above contains a nonvolatile memory in which the data TM*max of the limit torque table is written, and from the nonvolatile memory, the microcomputer MPU reads the data to write it into the RAM in the process in which an operating voltage is applied to the microcomputer to initialize itself and the motor drive system shown in FIG. 1. The microcomputer contains a plurality of other similar look-up tables that also means, similarly to the limit torque table, memory areas in the RAM in which the reference data stored in the nonvolatile memory are written, as will be described later.

In the secondary target voltage calculation 41, the microcomputer MPU of the motor control device 30 makes a determination as to whether "power running" or "regeneration" based on the target torque T* and the rotational speed ω, and reads the secondary target voltage Vuc* assigned to the rotational speed ω of the electric motor 10 from a secondary target voltage table assigned to the target torque T* that belongs to "power running" group in the case of "power running" or to "regeneration" group in the case of "regeneration." Each of the secondary target voltage tables in "power running" group is a look-up table containing the secondary target voltage values for power running corresponding to the rotational speeds. Each of the secondary target voltage tables in "regeneration" group is a look-up table containing the secondary target voltage values for regeneration corresponding to the rotational speeds.

By a feedback control calculation 42, the microcomputer MPU provides a control output Pvc for making the secondary voltage Vuc coincide with the secondary target voltage Vuc* to a PWM pulse generator 43, based on the secondary target voltage Vuc* and the present secondary voltage Vuc. The pulse generator 43 converts the control output Pvc to a PWM pulse Pvf for driving on and off the voltage step-up switching element 22 of the converter 20 and a PWM pulse Pvr for driving on and off the voltage step-down switching element 23 of the converter 20, and outputs the PWM pulses Pvf and Pvr to a drive circuit 29v (FIG. 1). The drive circuit 29v turns on and off the switching elements 22 and 23, based on the PWM pulses Pvf and Pvr. Hereby, the switching elements 22 and 23 are driven on and off by the PWM pulses so that the secondary voltage Vuc of the converter 20 coincides with the target value Vuc*. Note that, in order to prevent on-periods of the switching elements 22 and 23 from overlapping each other, the timings to issue on-commands of the signals Pvf and Pvr are properly set and a dead time during which the both switching elements are turned off is set between the on-periods of the switching elements 22 and 23.

The microcomputer of the motor control device 30 performs feedback control by conducting a vector control calculation on a known d-q axis model in which the d-axis coincides with the direction of a pair of magnetic poles in the rotor of the electric motor 10 and the q-axis is set to be perpendicular to the d-axis, in the "output calculation" 35. Then, the microcomputer converts to digital and reads the current detection signals iu, iv, and iw of the current sensors 14 to 16, respectively, and corrects the detected currents iu, iv, and iw by amounts of imbalance in "detected current correction" 31a. The contents of this will be described later with reference to FIGS. 3A-3D. The microcomputer converts the corrected three-phase currents iu", iv", and iw", that is, balanced three-phase currents (detected values) to two-phase current values id and iq (detected values: feedback values) on the d-axis and the q-axis, respectively, of the rotating coordinates, using a three-phase/two-phase conversion that is a known fixed/rotating coordinate transformation, in "current feedback" 32.

The output calculation 35 includes a first high-efficiency torque curve table A that serves as a look-up table. Written in the first high-efficiency torque curve table A are the d-axis current values id each of which corresponds to the motor speed ω and the motor target torque T* for generating each of the target torques T* at each motor speed.

The output torque of the electric motor is determined corresponding to respective values of the d-axis current id and the q-axis current iq. There are infinite number of combinations of the id and the iq for outputting the same torque corresponding to a single rotational speed value, that is, at the same motor rotational speed, and the combinations of the id and the iq lie on a constant torque curve. There is a combination of the id and the iq on the constant torque curve at which the maximum power use efficiency (minimum power consumption) is obtained, and that combination represents a high-efficiency torque point. A curve connecting the high-efficiency torque points on a plurality of the torque curves is the high-efficiency torque curve, which exists corresponding to each rotational speed. By setting to the d-axis current id and the q-axis current iq corresponding to the position of a given value of the motor target torque T* on the high-efficiency torque curve for a motor rotational speed as the target current values, and by energizing the electric motor 10 based on the target current values, the electric motor 10 outputs an output torque of the target value T* with a high power use efficiency for the motor energization.

The present embodiment calculates a d-axis target current id* and a q-axis target current iq* corresponding to the target torque on the d-q coordinates, based on the high-efficiency torque curve, and calculates target voltages Vd* and Vq* on the respective axes based on these target currents, and further converts these target voltages to three respective phase control voltages. Because the high-efficiency torque curves for "power running" and "regeneration" are asymmetric to each other (the values of id* or iq* differ from each other for target torques of the same absolute value), the accuracy of torque control deteriorates if one set of secondary target voltage characteristics corresponding to each target torque is shared between "power running" and "regeneration." Consequently, the present embodiment has two sets of the secondary target voltage characteristics for "power running" and "regeneration" corresponding to the target torques of the same absolute value.

In the present embodiment, the high-efficiency torque curve is divided into two lines, that is, a first high-efficiency torque curve A that represents the d-axis value, and a second high-efficiency torque curve B that represents the q-axis value. The first high-efficiency torque curve A includes a pair of curves applied to the power running region and the regeneration region, respectively, both representing the d-axis target current with respect to the motor rotational speed and the target torque.

The first high-efficiency torque curve table A is a memory area in which the d-axis target current corresponding to the target torque T* for generating the target torque with a minimum power consumption is written, and is composed of a pair of a power running table A1 for power running and a regeneration table A2 for regeneration. According to the result of the judgment whether the case is the power running or the regeneration based on the rotational speed ω of the electric motor and the target torque T* given, it is determined which of the table for power running or the table for regeneration is to be used.

Note that, as the rotational speed ω of the electric motor 10 increases, back electromotive forces generated in the stator coils 11 to 13 are increased to raise terminal voltages of the coils 11 to 13. Accordingly, it becomes difficult to supply the target current from the inverter 28 to the coils 11 to 13, thus failing to obtain the targeted torque output. In this case, the target torque T* can be output by reducing the d-axis current id and the q-axis current iq by Δid and Δiq, respectively, along the constant torque curve for the motor target torque T* given, though the power use efficiency is reduced. This is called a field weakening control. A d-axis field weakening current Δid is generated by a field weakening current calculation 36 so as to be used to calculate a d-axis current command. The contents thereof will be described later.

In the calculation of the d-axis current command in the "output calculation" 35, the microcomputer MPU calculates a d-axis target current id* by subtracting the d-axis field weakening current Δid from the d-axis current value id that has been read from the first high-efficiency torque curve table A corresponding to the target torque T* determined by the torque command limitation as follows: id*=−id−Δid.

In the calculation of the q-axis current command, a second high-efficiency torque curve table B in the output calculation 35 is used. The second high-efficiency torque curve B representing the q-axis value of the high-efficiency torque curve is corrected into a curve representing a q-axis target current that is obtained by subtracting the q-axis field weakening current Δiq paired with the d-axis field weakening current Δid. The data of the second high-efficiency torque curve B after corrected is stored in the second high-efficiency torque curve table B. The second high-efficiency torque curve table B is a memory area in which the d-axis target current corresponding to the target torque T* and the d-axis field weakening current Δid for generating the target torque with a minimum power consumption, that is, the target current on the second high-efficiency torque curve B after corrected, is written, and is also composed of a pair of a power running table B1 for power running and a regeneration table B2 for regeneration. According to the result of the judgment whether the case is the power running or the regeneration based on the rotational speed ω of the electric motor and the target torque T*, it is determined which of the table for power running or the table for regeneration is to be used. Then, in the calculation of the q-axis current command, the q-axis target current iq* corresponding to the target torque T* and the d-axis field weakening current Δid is read from the second high-efficiency torque curve table B and used as the q-axis current command.

In the output calculation 35, the microcomputer of the motor control device 30 calculates a current deviation δid between the d-axis target current id* and the d-axis current value id (detected value), and a current deviation δiq between the q-axis target current iq* and the q-axis current value iq (detected value), and then based on the current deviations δid and δiq, performs proportional control and integral control (PI calculation of feedback control) to calculate a d-axis voltage command value Vd* and a q-axis voltage command value Vq* serving as output voltages.

Next, a two-phase/three-phase conversion 37 serving as rotating/fixed coordinate transformation converts target voltages Vd* and Vq* on the rotating coordinate system to target voltages VU*, VV*, and VW* for respective phases on the fixed coordinate system, according to the two-phase/three-phase conversion. The target voltages VU*, VV*, and VW* for respective phases are sent to a PWM pulse generator 40 through a modulation 39 when the voltage control mode, that is, the modulation mode is a three-phase modulation mode. When the voltage control mode is a two-phase modulation mode, the target voltages VU*, VV*, and VW* for respective phases in the three-phase modulation mode are converted to voltages of the two-phase modulation by two-phase modulation conversion of the modulation 39, and sent to the PWM pulse generator 40. When the modulation mode is a 1 pulse mode in which all phases are energized by rectangular waves, target voltages VU*, VV*, and VW* for respective phases in the three-phase modulation mode are converted to respective phase voltages energizing with rectangular waves by 1 pulse conversion in the modulation 39, and provided to the PWM pulse generator 40.

The PWM pulse generator 40 that has been provided with the three-phase target voltages VU*, VV*, and VW* converts them to PWM pulses MU, MV, and MW, respectively, for outputting the three-phase target voltages, and outputs the PWM pulses MU, MV, and MW to the drive circuit 29*m* shown in FIG. 1. The drive circuit 29*m* generates the six sequences of drive signals in parallel based on the PWM pulses MU, MV, and MW, and switches on and off the respective transistors Tr1 to Tr6 of the voltage type inverter 28 through the drive signals of the respective sequences. As a result, the VU*, VV*, and VW* are applied to the stator coils 11 to 13, respectively, of the electric motor 10 to flow the phase currents iu, iv, and iw. The PWM pulse generator 40 that has been provided with target voltages for respective phases in the two-phase modulation mode generates two phases of PWM pulses and the remaining one phase of an on or off signal (constant voltage output), and sequentially switches over the phase of the on or off signal. When provided with target voltages for respective phases in the 1 pulse modulation mode, the PWM pulse generator 40 outputs energizing interval signals that energize the respective phases with rectangular waves.

The field weakening current calculation 36 calculates a voltage saturation indicator m that is a parameter for the field weakening control. That is, based on the d-axis voltage command value Vd* and the q-axis voltage command value Vq*, the field weakening current calculation 36 calculates a calculated voltage saturation value $\Delta V$ as a value representing a degree of voltage saturation, and then calculates the field adjustment amount. In the calculation of the field adjustment amount, the $\Delta V$ is summed up to obtain a sum $\Sigma\Delta V$. If the sum $\Sigma\Delta V$ has a positive value, the sum $\Sigma\Delta V$ is multiplied by a proportionality constant to calculate the d-axis field weakening current $\Delta id$ for performing the field weakening control, and set the result to a positive set value. If the calculated voltage saturation value $\Delta V$ or the sum $\Sigma\Delta V$ has a zero or negative value, the adjustment value $\Delta id$ and the sum $\Sigma\Delta V$ are made to be zero. The d-axis field weakening current (adjustment value) $\Delta id$ is used in the calculation of the d-axis current command and in the calculation of the q-axis current command.

The "two-phase/three-phase conversion" 37 calculates an electric motor target voltage Vm* in the process of the two-phase/three-phase conversion. The calculation formula is Vm*=$\sqrt{(Vd^{*2}+Vq^{*2})}$. From the electric motor target voltage Vm* and the voltage Vuc of the secondary-side capacitor 26 (voltage value detected by the voltage sensor 27), a modulation control 38 calculates a modulation ratio Mi as Mi=Vm*/Vuc and determines the modulation mode based on the target torque T* and the rotational speed ω of the electric motor 10 and on the modulation ratio Mi. Depending on the determined modulation mode, the modulation control 38 commands the modulation 39 to output the respective target phase voltages for the modulation mode.

Figure 3A:
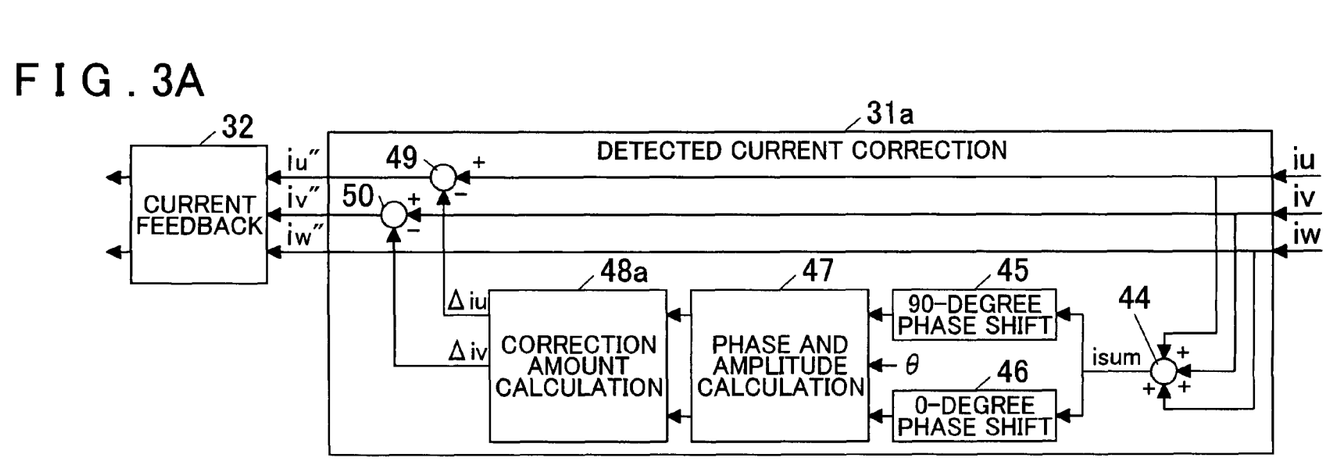
FIG. 3A is a block diagram showing a functional structure of a detected current correction shown in FIG. 2.
Figure 6:
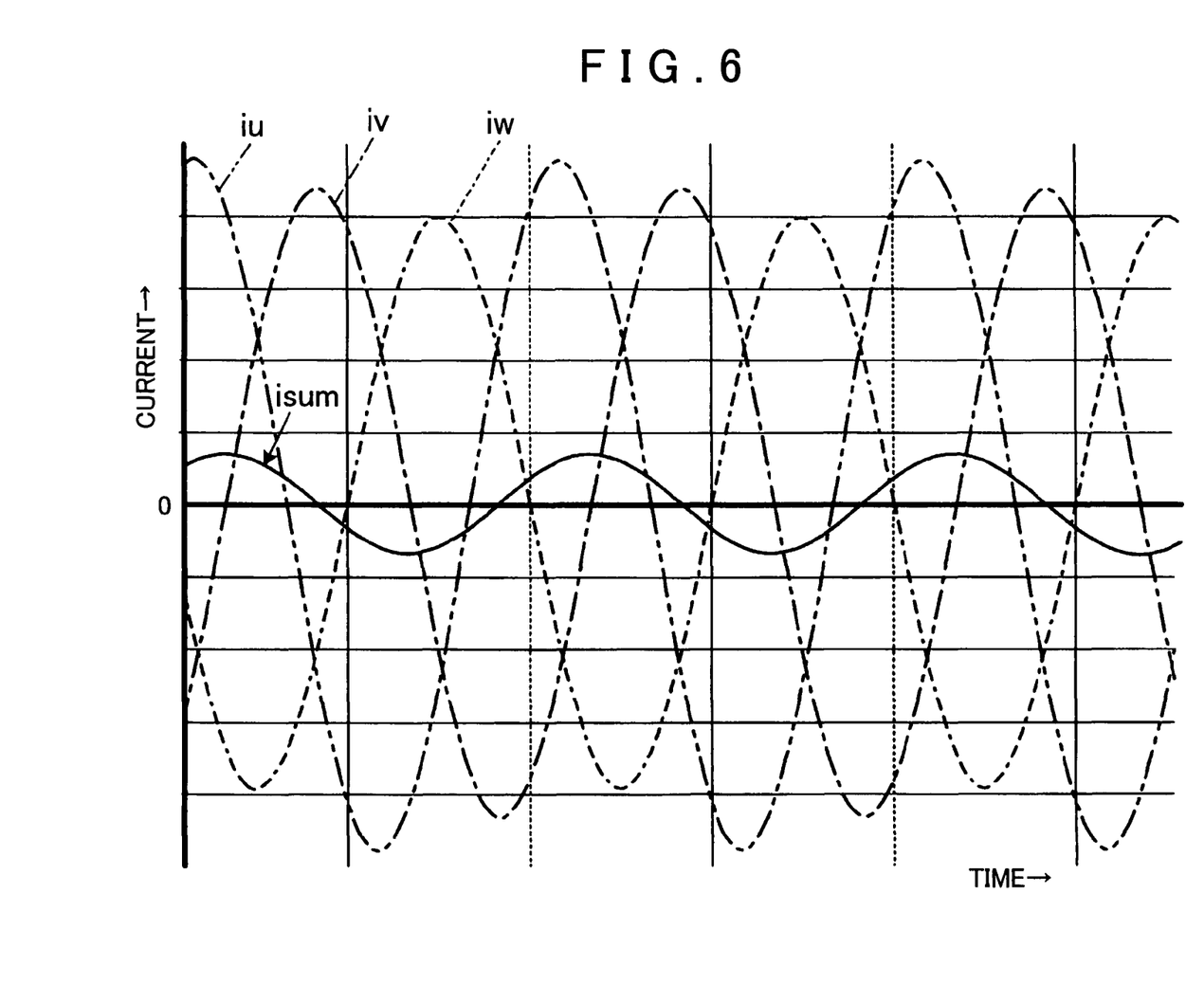
FIG. 6 is a graph showing imbalance among detected three-phase currents, and fluctuation of a sum of these detected three-phase currents in the case that the three respective phase currents of an electric motor are individually detected by three phase current sensors.

FIG. 3A shows a processing function of the "detected current correction" 31*a* shown in FIG. 2. The U-phase current detection value iu, the V-phase current detection value iv, and the W-phase current detection value iw detected by the current sensors 14 to 16, respectively, are added in an addition 44. The sum of the addition, that is, a resultant current, or an unbalanced current, isum is represented as isum=iu+iv+iw. The result is isum=0 if gains of the current sensors 14 to 16 are balanced with each other, whereas if the gains are unbalanced, the peak levels of the three phase current detection values iu, iv, and iw differ from each other, resulting in vibration of the resultant current isum at the frequency of the three-phase alternating current, for example, as shown in FIG. 6. Note that in the description below, the sum isum=iu+iv+iw is also called the unbalanced current, including in the case that the current is balanced. A 90-degree phase shift 45 phase-shifts the unbalanced current isum by 90 degrees. Hereby, the unbalanced current isum and a 90-degree phase-shifted current perpendicular thereto, that is, currents on the two mutually perpendicular axes are obtained. Based on these currents on the two mutually perpendicular axes, the phase φ and amplitude A of the unbalanced current isum that is phase-shifted by 0 degrees can be calculated. However, the calculation value of the 90-degree phase shift deviates from the isum by the time consumed for the calculation (delay time). If the delay time is known and can be assumed to be substantially constant, the phase φ and amplitude A of the unbalanced current isum can be calculated by delaying the isum by the delay time to make a pair with the calculation value of the 90-degree phase shift. However, in the present embodiment, in order to delay the isum by the time required for calculating the 90-degree phase shift, the isum is delayed by the time required for calculating the 90-degree phase shift by using also a 0-degree phase shift 46, and supplied to a phase and amplitude calculation 47 together with the 90-degree phase-shifted current to calculate the phase φ and the amplitude A of the isum. Then, a correction amount calculation 48*a* calculates a U-phase correction amount $\Delta iu$ and a V-phase correction amount $\Delta iv$ on the condition that a W-phase correction amount $\Delta iw=0$ (with reference to W-phase) by using the phase φ and the amplitude A. Then, subtractions 49 and 50 correct the U-phase current detection value iu and the V-phase current detection value iv by the amounts of $\Delta iu$ and $\Delta iv$, respectively, and output the results to the current feedback 32. The W-phase current detection value iw is provided to the current feedback 32 without change. The current detection values iu", iv", and iw" thus corrected as described above are balanced three-phase currents.

Figure 3B:
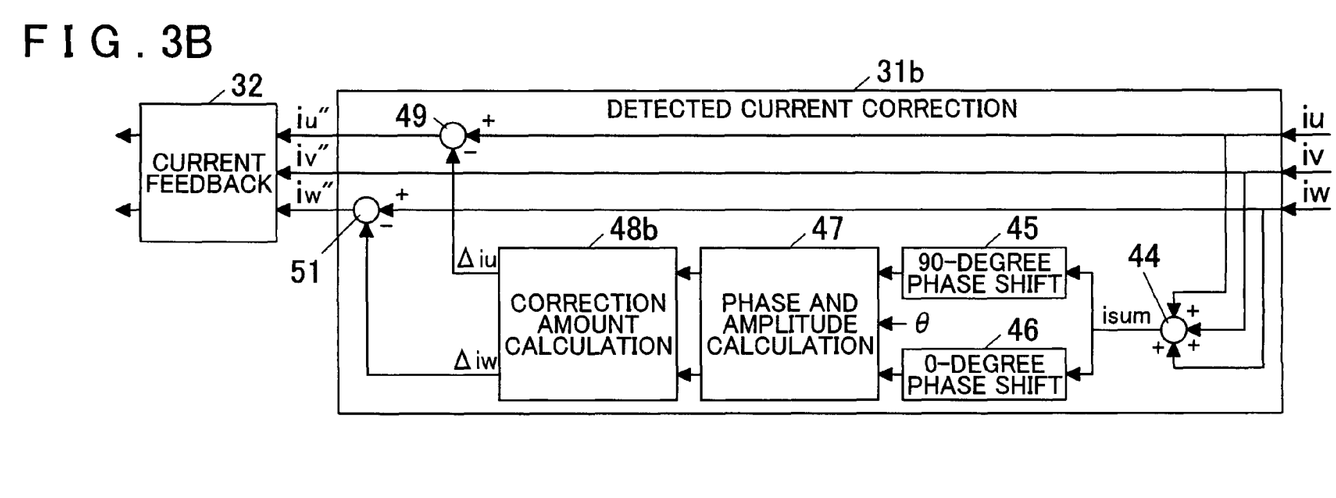
FIG. 3B is a block diagram showing a functional structure of another form of the detected current correction.
Figure 3C:
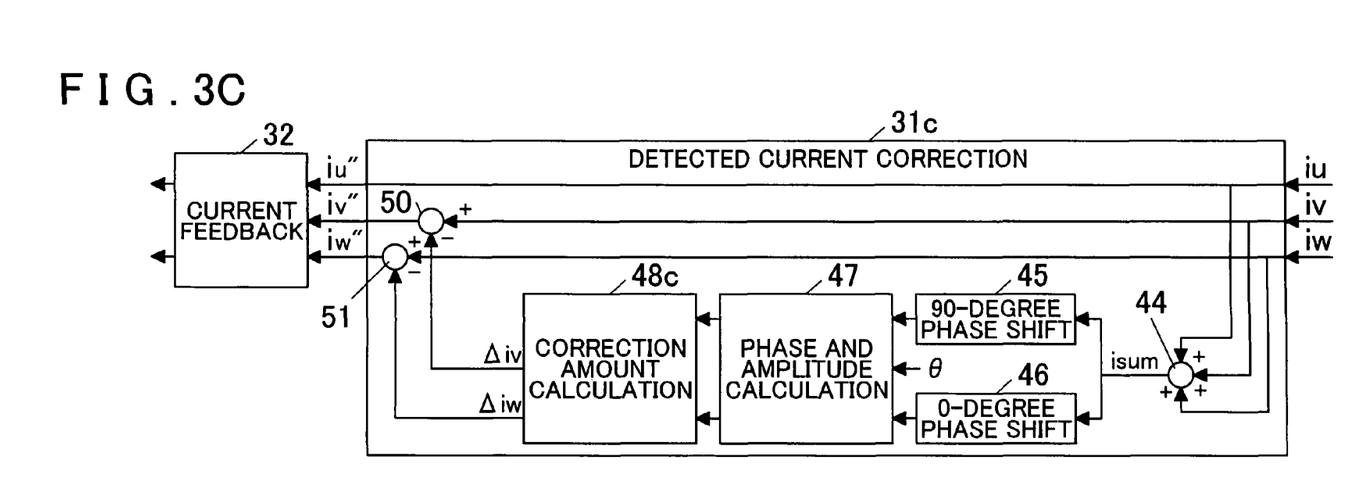
FIG. 3C is a block diagram showing a functional structure of still another form of the detected current correction.
Figure 3D:
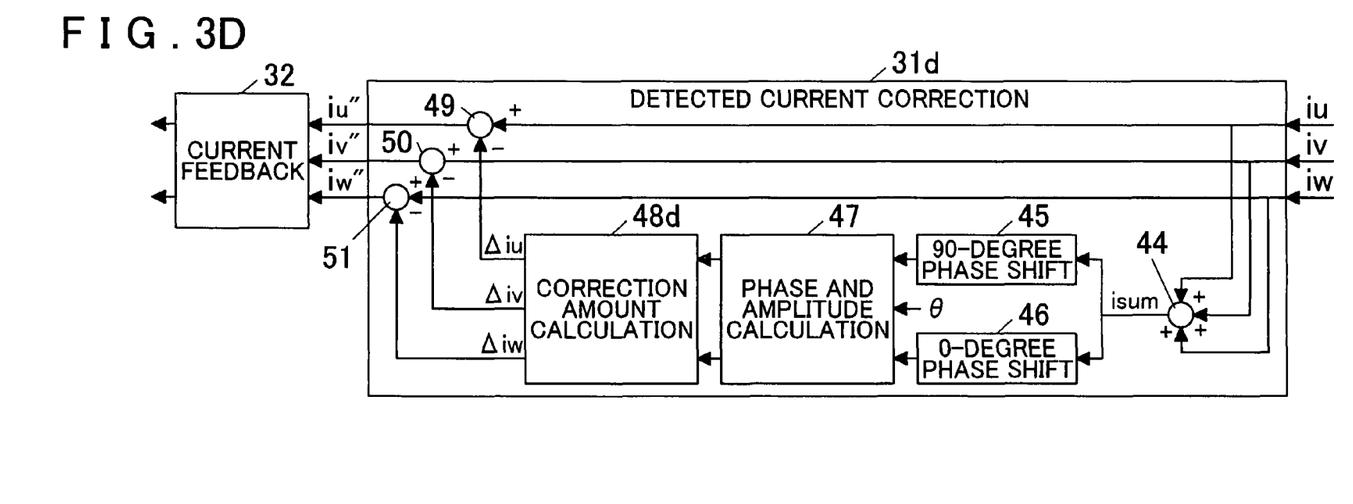
FIG. 3D is a block diagram showing a functional structure of further still another form of the detected current correction.

Note that, as shown in FIG. 3B, there is also an aspect in which the U-phase correction amount $\Delta iu$ and the W-phase correction amount $\Delta iw$ are calculated on the condition that the V-phase correction amount $\Delta iv=0$ (with reference to V-phase), and then subtractions 49 and 51 correct the U-phase current detection value iu and the W-phase current detection value iw by the amounts of $\Delta iu$ and $\Delta iw$, respectively, and output the results to the current feedback 32, providing the V-phase current detection value iv to the current feedback 32 without change. In addition, as shown in FIG. 3C, there is another aspect in which the V-phase correction amount $\Delta iv$ and the W-phase correction amount $\Delta iw$ are calculated on the condition that the U-phase correction amount $\Delta iu=0$ (with reference to U-phase), and then the subtractions 50 and 51 correct the V-phase current detection value iv and the W-phase current detection value iw by the amounts of $\Delta iv$ and $\Delta iw$, respectively, and output the results to the current feedback 32, providing the U-phase current detection value iu to the current feedback 32 without change. Moreover, as shown in FIG. 3D, there is still another aspect in which any one of the U-phase correction amount $\Delta iu$, the V-phase correction amount $\Delta iv$, and the W-phase correction amount $\Delta iw$ is given a certain value as a correction amount to calculate correction amounts for the other two phases so that the total of the certain value and the correction amounts for the other two phases amounts to zero, and the subtractions 49, 50, and 51 correct the U-phase, V-phase, and W-phase current detection values iu, iv, and iw by the amounts of $\Delta iu$, $\Delta iv$, and $\Delta iw$, respectively, and output the results to the current feedback 32.

Here, the contents of the correction of imbalance by the detected current corrections 31*a* to 31*d* shown in FIGS. 3A to 3D, respectively, will be described in detail with reference to formulas (1) to (20) shown in mathematical expressions 1 and 2 given below.

If there is an imbalance among gains of the three-phase current sensors 14 to 16, the detected currents iu, iv, and iw of the three-phase current sensors 14 to 16 can be represented by formula (1). If these detected currents are used for (feedback control calculation in) vector control in the "output calculation" 35, an imbalance is generated in the currents flowing through the three phase coils of the electric motor 10 because the "output calculation" 35 performs the feedback control calculation so that the respective phase currents of the same amplitude flow. This imbalance not only causes a motor torque ripple but also increases power loss of the electric motor.

If there is no imbalance, the sum isum of the detected currents iu, iv, and iw of the three-phase current sensors 14 to 16 amounts to zero as shown by formula (2), whereas if there is an imbalance, the sum isum forms a single-phase sinusoidal wave with the same frequency as that of the three-phase current, as can be represented by formula (3). By calculating the unbalanced components Δiu, Δiv, and Δiw of the currents caused by the imbalance in the current sensors 14 to 16, and subtracting the unbalanced components from the current detection values of respective phases to correct the current detection values, the balanced three-phase current detection values iu", iv", and iw" can be obtained. However, because isum=Δiu+Δiv+Δiw, it is sufficient to set one phase component (for example, Δiw) to zero or a certain value to calculate the other two-phase components.

If the phase φ and the amplitude A of the sum isum of the detected three-phase currents are obtained, one phase component (for example, Δiw) of the sum isum can be set to zero or a certain value to calculate the other two phase components. However, because the phase φ and the amplitude A cannot be obtained from an instantaneous value of a single-phase sinusoidal wave, a 90-degree phase-shifted value, that is, a perpendicular axis value isum sin is calculated by the 90-degree phase shift 45 using formula (4). In addition, a 0-degree phase-shifted value isum cos having the same delay time as the delay time by the 90-degree phase shift calculation is calculated by the 0-degree phase shift 46 using formula (5). The phase φ is calculated by formula (6) using the 90-degree phase-shifted value isum sin and the 0-degree phase-shifted value isum cos. There is also an aspect in which the phase φ is calculated by formula (7). The amplitude A is calculated by formula (8) or (9). The phase and amplitude calculation 47 shown in FIGS. 3A to 3D calculates the phase φ based on the formula (6) and also calculates the amplitude A based on the formula (8).

Mathematical Expression 1
Detected Currents where iu', iv', and iw' are true values of three-phase currents.

where: iu, iv, and iw are detection values of three-phase currents; I is amplitude of current; θ is phase of current;

ku, kv, and kw are amplification factors (gains) of respective phase current sensors;

iu', iv', and iw' are true values of three-phase currents;

isum is sum of detected three-phase currents; A is amplitude of sum of three-phase currents; and φ is phase of sum of three-phase currents.

Phase φ and Amplitude A of Sum isum of Detected Three-Phase Currents 90-degree phase-shifted current isum sin of sum isum of detected three-phase currents:

where s is Laplace operator; ω is frequency of current; and ζ is design parameter.

0-degree phase-shifted current isum cos with the same delay as that of 90-degree phase-shifted current isum sin:

In the aspect shown in FIG. 3A, the W-phase unbalanced component Δiw is set to zero, and the U-phase and V-phase unbalanced components Δiu and Δiv are calculated to be used to correct the U-phase and V-phase current detection values iu and iv. In this case, because Δiu+Δiv+Δiw=isum cos=A sin (θ+φ) and Δiw=0, formula (10) below are satisfied, where U-phase and V-phase corrected gains are denoted as ku' and kv'. Based on those formulas, the corrected gains ku' and kv' are calculated as shown by formula (11), then Δiu and Δiv are calculated by formula (19), and finally the U-phase and V-phase current detection values iu and iv are corrected to iu" and iv", respectively, by formula (20). Specifically, calculation formula that use the 90-degree phase-shifted value isum sin and the 0-degree phase-shifted value isum cos as input values to output the two-phase correction amounts Δiu, Δiv, and Δiw (=0) are obtained by combining the formulas (6), (8), (11), and (19), that is, by substituting the formulas (6) and (8) for respectively calculating the phase φ and the amplitude A to the formula (11) and then substituting the gain calculation formula of the (11) to the formula (19). Based on the calculation formulas thus obtained, the "phase and amplitude calculation" 47 and the "correction amount calculation" 48a shown in FIG. 3A calculate the correction amounts Δiu, Δiv, and Δiw from the 90-degree phase-shifted value isum sin and the 0-degree phase-shifted value isum cos, and then the subtractions 49 and 50 correct the detected three-phase currents iu, iv, and iw to the balanced phase currents iu", iv", and iw" (iw"=iw), respectively, to provide the results as three-phase current detection values (feedback values) to the "current feedback" 32.

In the aspect shown in FIG. 3B, the V-phase unbalanced component Δiv is set to zero, and the U-phase and W-phase unbalanced components Δiu and Δiw are calculated to be used to correct the U-phase and W-phase current detection values iu and iw. In this case, because Δiu+Δiv+Δiw=isum cos=A cos(θ+φ) and Δiv=0, formula (12) below are satisfied, where U-phase and W-phase corrected gains are denoted as ku' and kw'. Based on those formulas, the corrected gains ku' and kw' are calculated as shown by formula (13), then Δiu and Δiw are calculated by the formula (19), and finally the U-phase and W-phase current detection values iu and iw are corrected to iu" and iw", respectively, by the formula (20). Also in this aspect, similarly to the description above, based on the calculation formulas that use the 90-degree phase-shifted value isum sin and the 0-degree phase-shifted value isum cos as input values to output the two-phase correction amounts Δiu, Δiv (=0), and Δiw, the "phase and amplitude calculation" 47 and the "correction amount calculation" 48b calculate the correction amounts Δiu, Δiv, and Δiw from the 90-degree phase-shifted value isum sin and the 0-degree phase-shifted value isum cos, and then the subtractions 49 and 51 correct the detected three-phase currents iu, iv, and iw to the balanced phase currents iu", iv", and iw" (iv"=iv), respectively, to provide the results as three-phase current detection values (feedback values) to the "current feedback" 32.

In the aspect shown in FIG. 3C, the U-phase unbalanced component Δiu is set to zero, and the V-phase and W-phase unbalanced components Δiv and Δiw are calculated to be used to correct the V-phase and W-phase current detection values iv and iw. In this case, because Δiu+Δiv+Δiw=isum cos=A cos (θ+φ) and Δiu=0, formula (14) below is satisfied, where V-phase and W-phase corrected gains are denoted as kv' and kw'. Based on those formulas, the corrected gains kv' and kw' are calculated as shown by formula (15), then Δiv and Δiw are calculated by the formula (19), and finally the V-phase and W-phase current detection values iv and iw are corrected to iu''' and iw''', respectively, by the formula (20). Also in this aspect, similarly to the description above, based on the calculation formulas that use the 90-degree phase-shifted value isum sin and the 0-degree phase-shifted value isum cos as input values to output the two-phase correction amounts Δiu (=0), Δiv, and Δiw, the "phase and amplitude calculation" 47 and the "correction amount calculation" 48c calculate the correction amounts Δiu, Δiv, and Δiw from the 90-degree phase-shifted value isum sin and the 0-degree phase-shifted value isum cos, and then the subtractions 50 and 51 correct the detected three-phase currents iu, iv, and iw to the balanced phase currents iu''', iv''', and iw''' (iu'''=iu), respectively, to provide the results as three-phase current detection values (feedback values) to the "current feedback" 32.

In the aspect shown in FIG. 3D, because Δiu+Δiv+Δiw=isum cos=A cos(θ+φ), formula (16) is satisfied, and therefore formula (17) is obtained. In this case, although an infinite number of solutions exist because the number of the unknown quantities that are the corrected gains ku', kv', and kw' for respective phases is greater than the number of simultaneous equations, formula (18) is adopted as one set of simple solutions. Then, Δiu, Δiv, and Δiw are calculated by the formula (19), and then the U-phase, V-phase, and W-phase current detection values iu, iv, and iw are corrected to iu''', iv''', and iw''', respectively, by the formula (20). Also in this aspect, similarly to the description above, based on the calculation formulas that use the 90-degree phase-shifted value isum sin and the 0-degree phase-shifted value isum cos as input values to output the three-phase correction amounts Δiu, Δiv, and Δiw, the "phase and amplitude calculation" 47 and the "correction amount calculation" 48d calculate the correction amounts Δiu, Δiv, and Δiw from the 90-degree phase-shifted value isum sin and the 0-degree phase-shifted value isum cos, and then the subtractions 49, 50, and 51 correct the detected three-phase currents iu, iv, and iw to the balanced phase currents iu''', iv''', and iw''', respectively, to provide the results as three-phase current detection values (feedback values) to the "current feedback" 32.

Mathematical Expression 2

Calculation of Balancing Amplification Factors ku', kv', and kw'

Calculation of Phase Correction Amounts Δiu, Δiv, and Δiw

Calculation of Balanced Phase Currents iu''', iv''', and iw'''

The microcomputer MPU shown in FIG. 2 is provided not only with a CPU but also a RAM, a ROM, and a flash memory for recording data and various programs. The programs, reference data, and look-up tables stored in the ROM or the flash memory are written into the RAM, and based on the programs, the input processing, calculation, and output processing in the block enclosed by the two-dot chain line are executed.

Figure 4:
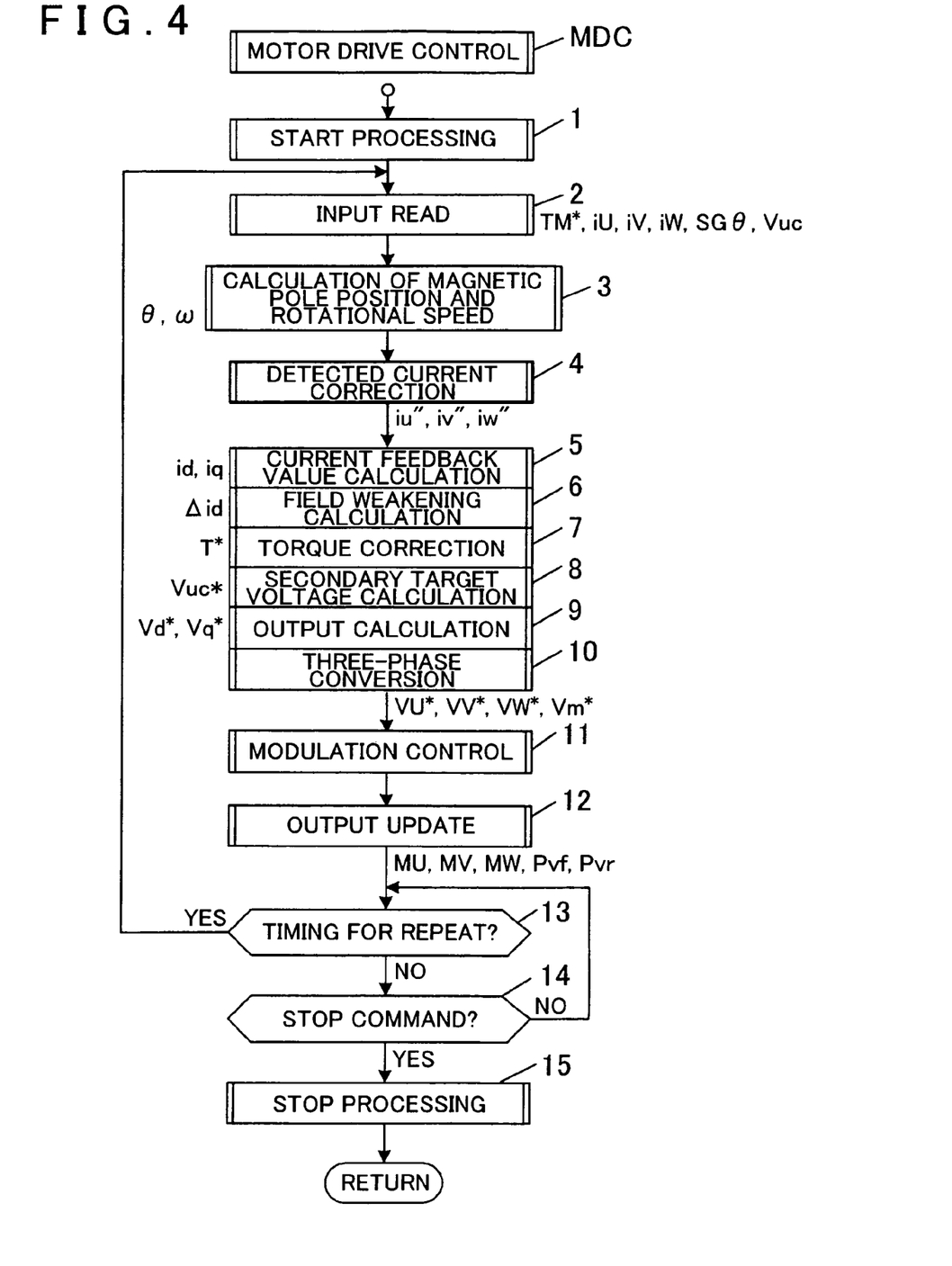
FIG. 4 is a flow chart showing an outline of motor control by a microcomputer shown in FIG. 2.

FIG. 4 shows an outline of motor drive control MDC executed by (the CPU of) the microcomputer MPU based on the programs. When an operating voltage is applied, the microcomputer MPU initializes itself, the PWM pulse generators 40 and 43, and the drive circuit 29m, and sets the inverter 28 for driving the electric motor 10 in the stop and standby state. Then, the microcomputer MPU waits for a motor drive start command from the unshown main controller of the vehicle drive control system. When the motor drive start command is given, the microcomputer MPU sets initial values for the electric motor control in the internal registers in "start processing" (step 1), and reads input signals or data in "input read" (step 2). That is, the microcomputer MPU converts to digital and reads the first target torque TM* given by the main controller, the respective phase currents iu, iv, and iw detected by the current sensors 14 to 16, and the rotational angle signal SGθ of the resolver 17.

Note that only the step number will be shown in parentheses with the word "step" omitted in the description below.

Next, the microcomputer MPU calculates the rotational angle θ and the rotational speed ω based on the rotational angle signal SGθ (rotational angle data SGθ) that has been read (3). This function is shown as an angle and speed calculation 33 in FIG. 2. Next, the microcomputer MPU corrects the three-phase current detection signals iu, iv, and iw that have been read to the balanced three-phase current values iu''', iv''', and iw''' (4). This function is shown as the "detected current correction" 31a in FIGS. 2 and 3A. Next, the microcomputer MPU converts the balanced three-phase current values iu''', iv''', and iw''' to the two-phase d-axis current value id and the q-axis current value using the three-phase/two-phase conversion (5). This function is shown as the current feedback 32 in FIG. 2. Next, the microcomputer MPU calculates the d-axis field weakening current Δid for performing d-axis field weakening control (6). This function is shown as the field weakening current calculation 36 in FIG. 2. Next, the microcomputer MPU reads from the limit torque table the limit torque TM*max corresponding to the motor target torque TM* and the secondary target voltage Vuc* that have been read, and the rotational speed ω that has been calculated, and if the motor target torque TM* read exceeds the TM*max, determines the TM*max as the target torque T*. If the motor target torque TM* is equal to or less than the TM*max, the motor target torque TM* read is determined as the target torque T* (7). This function is shown as the torque command limitation 34 in FIG. 2.

Next, in the "secondary target voltage calculation" (8), the microcomputer MPU determines whether the electric motor 10 is performing "power running" operation or "regeneration" operation, then selects the group corresponding to the determination result, and reads the secondary target voltage Vuc* assigned to the present rotational speed ω from the secondary target voltage table corresponding to the target torque T* among tables belonging to the group. The contents of "secondary target voltage calculation" (8) are the same as the contents of the above-described secondary target voltage calculation 41 shown in FIG. 2.

The contents of "output calculation" (9) are the same as the contents of the above described output calculation 35 shown in FIG. 2. The d-q axis target voltage values Vd* and Vq* that have been calculated in the "output calculation" (9) are converted to the target voltages VU*, VV*, and VW* for respective phases in the three-phase modulation mode (10). The electric motor target voltage Vm* is also calculated at the same time. A next step "modulation control" (11) calculates the modulation ratio Mi, and determines the modulation mode based on the modulation ratio Mi, the target torque T*, and the rotational speed ω.

Parameters referred to for determining the modulation mode include the target torque T*, rotational speed ω, and the modulation ratio Mi. The microcomputer MPU has modulation threshold tables (look-up tables) corresponding to the modulation modes (three-phase modulation, two-phase modulation, and 1 pulse) and the modulation ratios, and each of the modulation threshold tables contains threshold values (target torque values and rotational speed values) of modulation mode boundaries. In the "modulation control" (11), the microcomputer MPU selects the modulation threshold table corresponding to the present modulation mode (three-phase modulation, two-phase modulation, or 1 pulse) and the modulation ratio Mi, then reads the threshold values, and compares the target torque T* and the rotational speed ω with the threshold values to determine the next modulation mode to be adopted.

A next step "output update" (12) provides the PWM pulse output that outputs the target voltages for respective phases in the modulation mode determined in the modulation control (11) to the PWM pulse generator 40, and in addition, provides the PWM pulses Pvf and Pvr for driving the converter as output to the PWM pulse generator 43. Next, after a period of time waiting for the timing for next repetitive processing (13), the microcomputer MPU proceeds to the "input read" (2) again, and then executes the "input read" (2) described above and the later processing. If a stop command is issued from a system controller while waiting for the timing for next repetitive processing, the microcomputer MPU stops the output for energizing the motor rotation (14 and 15) at that time.

As described above, the three-phase current values iu, iv, and iw detected by the current sensors 14 to 16 are corrected to the balanced three-phase current values iu", iv", and iw" in "detected current correction" (4) shown in FIG. 4 (in the detected current correction 31a shown in FIG. 2), and these current values iu", iv", and iw" are converted to the two-axis values id and iq, which are then fed back to the "output calculation" (9) shown in FIG. 4 (to the output calculation 35 shown in FIG. 2) to generate the two-axis target voltage values Vd* and Vq* by the feedback control calculation together with the two-axis target values id* and iq*. In a three-phase conversion (10) shown in FIG. 4 (in the two-phase/three-phase conversion 37 shown in FIG. 2), the target voltage values Vd* and Vq* thus generated are converted to the three-phase target voltages VU*, VV*, and VW* which are applied to the three phase coils of the electric motor 10 through PWM (pulse width modulation). Therefore, the motor torque ripple caused by the imbalance in the current detection values of the three-phase current sensors 14 to 16 is reduced, and also the power loss of the motor is reduced.

Second Embodiment

Figure 5:
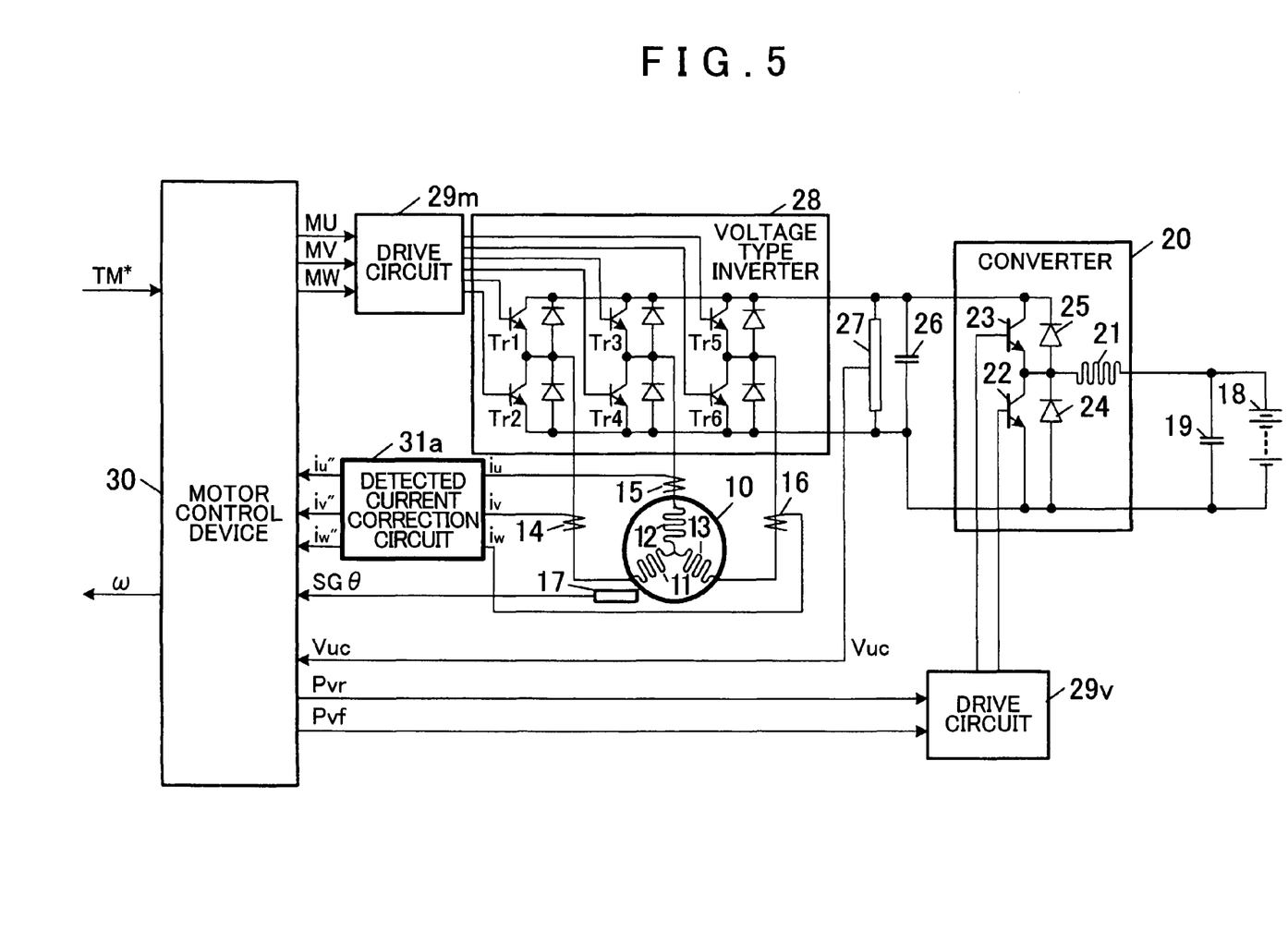
FIG. 5 is a block diagram showing an outline of a structure according to a second embodiment of the present invention.

After the microcomputer MPU has A/D converted the three-phase current values iu, iv, and iw detected by the current sensors 14 to 16 to the three-phase current data, and has read the three-phase current data, the above-described "detected current correction" (4) of the first embodiment shown in FIG. 4 (the detected current correction 31a shown in FIG. 2) calculates the balanced three-phase current values iu", iv", and iw" by digital calculation processing based on the three-phase current data. However, in a second embodiment, as shown in FIG. 5, a detected current correction circuit 31a that is an analog electrical circuit is provided outside of the motor control device 30. The detected current correction circuit 31a converts the three-phase current values iu, iv, and iw (analog) detected by the three-phase current sensors 14 to 16 to the balanced current values iu", iv", and iw" (analog) by analog calculation processing.

The function of the motor control device 30 of the second embodiment shown in FIG. 5 is such that the detected current correction 31a shown in FIG. 2 and the "detected current correction" (4) shown in FIG. 4 are removed, and the "input read" (2) in FIG. 4 converts to digital and reads the balanced three-phase current values iu", iv", and iw" that are output from the detected current correction circuit 31a. The outline of the structure of the detected current correction circuit 31a shown in FIG. 5 is similar to that shown in FIG. 3A except that all of the blocks 44 to 50 in the detected current correction circuit 31a shown in FIG. 5 are analog circuits mainly composed of operational amplifiers and coefficient setting resistors.

Note that, also in the second embodiment, there are also aspects in which the detected current correction circuit has the same block structure as that of the detected current correction 31b, 31c, or 31d (44 to 48) shown in FIG. 3B, 3C, or 3D, respectively, whereas each of the blocks is formed by an analog circuit similarly to the detected current correction circuit 31a shown in FIG. 5.

According to an exemplary aspect of the invention, the motor current detection values of the three-phase current sensors can be automatically corrected in real time so as to achieve stable and accurate electric motor drive control.

What is claimed is:

1. An electric motor control device comprising:
    a power supply unit that supplies power to a three-phase electric motor;
    a three-phase current sensor that individually detects three respective phase currents of the three-phase electric motor;
    a summing unit that calculates a three-phase sum by adding the three phase currents detected by the three-phase current sensor;
    a detected current correction unit that calculates correction amounts for at least two of the three phase currents based on a phase and an amplitude of the three-phase sum and then corrects phase current detection values by the calculated correction amounts; and
    a motor control unit that controls a power supply by the power supply unit to the three-phase electric motor by feedback control based on the three phase currents after correction by the detected current correction unit and on target currents.

2. The electric motor control device according to claim 1, wherein the detected current correction unit includes a phase-shift unit that phase-shifts the three-phase sum to different two axes, and calculates a phase and an amplitude of the three-phase sum based on the three-phase sum that has been phase-shifted by the phase-shift unit.

3. The electric motor control device according to claim 2, wherein the phase-shift unit performs a phase shift to two mutually perpendicular axes of 0 degrees and 90 degrees.

4. The electric motor control device according to claim 3, wherein:
    the detected current correction unit calculates correction amounts for two of the three phases by using a phase and an amplitude, and corrects corresponding phase current detection values by the respective correction amounts, and
    the motor control unit performs the feedback control based on two-phase currents after correction and on a detected value of the other one phase current.

5. The electric motor control device according to claim 3, wherein:
    the detected current correction unit calculates correction amounts for the three phases by using a phase and an amplitude, and corrects corresponding phase current detection values by respective correction amounts, and
    the motor control unit performs the feedback control based on the three phase currents after correction.

6. The electric motor control device according to claim 1, wherein:
    the detected current correction unit calculates correction amounts for two of the three phases by using a phase and an amplitude, and corrects corresponding phase current detection values by respective correction amounts, and the motor control unit performs the feedback control based on two-phase currents after correction and on a detected value of the other one phase current.

7. The electric motor control device according to claim 1, wherein:
the detected current correction unit calculates correction amounts for the three phases by using a phase and an amplitude, and corrects corresponding phase current detection values by respective correction amounts, and
the motor control unit performs the feedback control based on the three phase currents after correction.

8. The electric motor control device according to claim 1, wherein:
the power supply unit contains a direct current power source and an inverter for controlling an exchange of electric power between the three-phase electric motor and the direct current power source, and
the motor control unit converts the three phase currents after being corrected by the detected current correction unit to two axis currents, and based on the two axis currents and two axis target currents that are based on a target torque and a rotational speed of the three-phase electric motor and that serve for making an output torque of the three-phase electric motor coincide with the target torque, generates inverter drive signals to control the inverter.

9. The electric motor control device according to claim 1, wherein:
the detected current correction unit is a digital data processing unit that performs, by digital data processing, a correction of three-phase current data A/D converted from analog detection signals of the three-phase current sensor, and
the motor control unit A/D converts the analog detection signals of the three-phase current sensor to the three-phase current data, which are then given to the digital data processing unit so as to be corrected, and converts the three-phase current data corrected by the digital data processing unit to two axis currents.

10. The electric motor control device according to claim 1, wherein:
the detected current correction unit is a detected current correction circuit that performs, through an analog processing circuit, a correction of the analog detection signals of the three-phase current sensor, and
the motor control unit A/D converts and reads the analog detection signals corrected by the detected current correction circuit.

11. A drive unit comprising:
the electric motor control device according to claim 1; and
an electric motor for driving wheels that is the electric motor supplied with power by an inverter of the electric motor control device.

* * * * *